Feb. 4, 1958 P. C. SANDRETTO 2,822,536
METEOROLOGICAL RADAR
Filed Dec. 31, 1954 3 Sheets-Sheet 1

INVENTOR
PETER C. SANDRETTO
BY
ATTORNEY

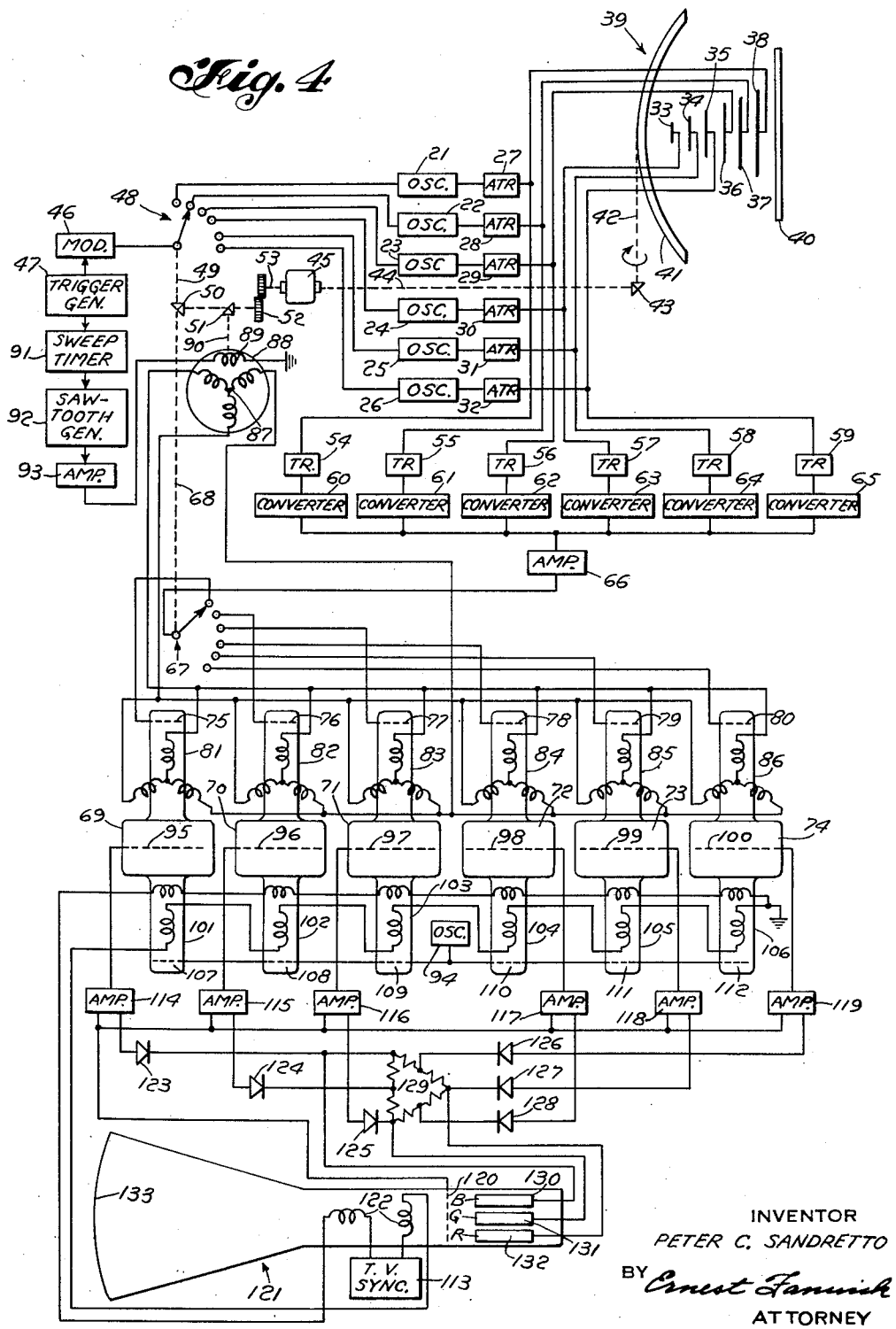

Feb. 4, 1958  P. C. SANDRETTO  2,822,536
METEOROLOGICAL RADAR
Filed Dec. 31, 1954  3 Sheets-Sheet 3

INVENTOR
PETER C. SANDRETTO
BY Ernest Zamwick
ATTORNEY

United States Patent Office 2,822,536
Patented Feb. 4, 1958

2,822,536

METEOROLOGICAL RADAR

Peter C. Sandretto, East Orange, N. J., assignor to International Telephone and Telegraph Corporation, Nutley, N. J., a corporation of Maryland Application December 31, 1954, Serial No. 479,087

8 Claims. (Cl. 343—11)

This invention relates to systems for ascertaining atmospheric conditions and more particularly to a meteorological radar system for determining the density of precipitation, the thickness and discontinuities of cloud formation, weather conditions and other navigational hazards in a surrounding area.

Considerable experimentation has been expended in attempting to devise means which would present to a pilot a more accurate picture of clouds and precipitation areas in a predetermined weather zone through which an aircraft must travel in order that the pilot could determine the safest path to follow. It has long been known that weather conditions such as hail, rain or clouds have the ability of reflecting and attenuating electromagnetic energy impinging thereon and that the reflection or scattering effect is different for each weather condition and for each frequency component of the electromagnetic spectrum and varies from one frequency component to another in a definite relationship to the type of weather condition in the zone being mapped. It is well known for instance that the attenuation of radio waves by precipitation varies as a function of the wavelength employed and for a predetermined precipitation density the smaller the wavelength of the transmitted energy the less the attenuation so that at a transmitting wavelength of approximately 3 centimeters a precipitation area of heavy rainfall causes an attenuation of as much as 7 db per kilometer but with an operating wavelength of 3 centimeters only a very small portion of a heavy precipitation area can be detected by a radar system since the transmitted energy is attenuated and does not have the ability of penetrating through the heavy rainfall. Conversely, it is equally unsatisfactory to use a transmitting frequency having a longer wavelength since the reflection or scattering of the energy decreases inversely with wavelength. In an area with very light precipitation there is a loss of substantially 40 db upon reflection when transmitting at a frequency having a wavelength of 10 centimeters whereas the reflection loss is of the order of only 20 db if a wavelength of 3 centimeters is utilized. Thus, the meteorological explorer is faced with a paradox that if he employs a low frequency for his meteorological radar system in order to penetrate the precipitation formations to determine their relative width, there is insufficient energy returned to give an accurate picture of the area whereas if he utilizes a high frequency in order to obtain sufficient energy return he is unable to penetrate the first curtain of precipitation that is encountered. This is particularly unsatisfactory if the curtain of precipitation presents a navigational hazard such as an extremely turbulent area of storm conditions from being detected.

It is, therefore, apparent from the above discussion that precipitation areas and various cloud formations exhibit certain selective reflection and attenuation characteristics that are particular to certain frequency ranges within the spectrum of the impinging electromagnetic energy. Furthermore, various precipitation densities and cloud structure, that differ from each other in their characteristics, show selective reflection and attenuation properties of particular frequencies that also differ from each other in relation to the corresponding physical characteristics of the meteorological phenomena being observed. Therefore, it may be said that in a weather zone, the manner in which various frequency components of impinging electromagnetic energy are reflected and attenuated depend upon the physical characteristics of the atmospheric condition and that for any one particular characteristic a particular frequency presents the optimum information.

One of the objects of this invention, therefore, is to provide a meteorological radar system yielding a graphical representation of the atmospheric conditions and navigational hazards in an area adjacent said system.

Another object of this invention is to provide a meteorological radar system transmitting a plurality of frequencies in order to explore a predetermined weather zone and graphically representing the information so obtained in an easily discernible manner.

It is a further object of my invention to determine the structure and physical characteristics of the precipitation and clouded area in a weather zone and through the use of a multifrequency radar system utilizing a multicolored display system.

In accordance with one of the features of my invention, the structure of a weather zone is determined by utilizing the property of precipitation and clouds to reflect or to attenuate impinging electromagnetic energy. A plurality of frequencies which are spread apart in the frequency spectrum are utilized to measure the reflection and attenuation of atmospheric conditions in an adjacent weather zone to provide an index representing the various meteorological characteristics present in the surrounding zone. A particular advantage of my invention consists in the utilization of colored cathode ray tube display means to easily present the information of the surrounding meteorological conditions and possible obstructions beyond.

In accordance with my invention, I transmit in sequence a plurality of widely spaced frequencies, the energy of which is reflected back to a receiving system from solid objects and weather zones having clouds or precipitation areas and the information so reflected is utilized to produce a colored display on the face of a cathode ray tube.

The above-mentioned and other features and objects of this invention will become more apparent by reference to the following description taken in conjunction with the accompanying drawings, in which:

Fig. 4 is one embodiment of a meteorological radar system in accordance with the principles of my invention; and, Fig. 5 is an alternate embodiment of a meteorological radar system in accordance with the principles of my invention.

Figure 1:
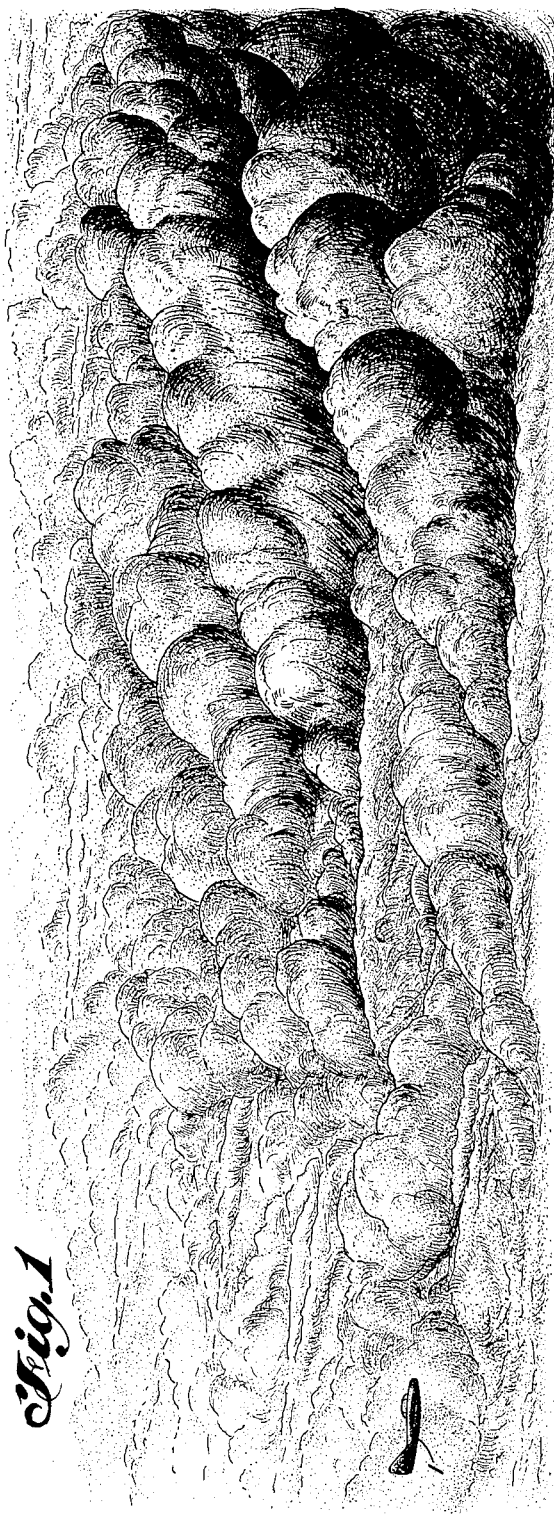
Fig. 1 is a plan view of an aircraft flying through a weather zone including clouds and precipitation areas of various densities.

Referring to Fig. 1 of the invention, 1 is an illustration of an aircraft flying in a weather zone through which a safe course must be navigated. It is of course understood that the pilot of the aircraft 1 is desirous of obtaining an accurate presentation of the precipitation densities and meteorological conditions in the weather zone about the aircraft in order for him to determine a safe path for the aircraft to travel. When the weather is bad and clouds form, creating precipitation areas or bad weather zones about the aircraft, it is extremely difficult for prior art radar systems to detect a safe flight path through the turbulent area because it has been determined that in its usual form radar systems will have its reflected energy effected by the type of meteorological conditions encountered. Due to this effect, only a portion of the needed information is available to the airplane pilot and he remains ignorant of both the depth of the weather zone, the type of weather conditions therein, as well as the weather hazards lying beyond the immediate clouded area.

Many compromises have been sought which would yield the maximum amount of information to an aircraft pilot in the most useful form. However, these compromises have normally proven unsatisfactory. This unsatisfactory operation of usual radar systems can be best understood by making reference to Fig. 2 wherein the attenuation of the electromagnetic energy transmitted by a standard radar system as a function of the wavelength of transmission is shown. It is readily discernible by interpretating the plurality of curves each representing a different precipitation density that regardless of the density of the rainfall the greater the wavelength the less attenuation is encountered by the transmitted energy and thus when utilizing a transmitting wavelength of 3 centimeters heavy rainfall causes attenuation of as much as 7 db per kilometer and when utilizing such an operating wavelength only a small portion of the heavy precipitation area such as 3 of Fig. 1 appears on the radar screen due to the inability of the radio waves to travel through the strata of heavy precipitation.

Figure 3:
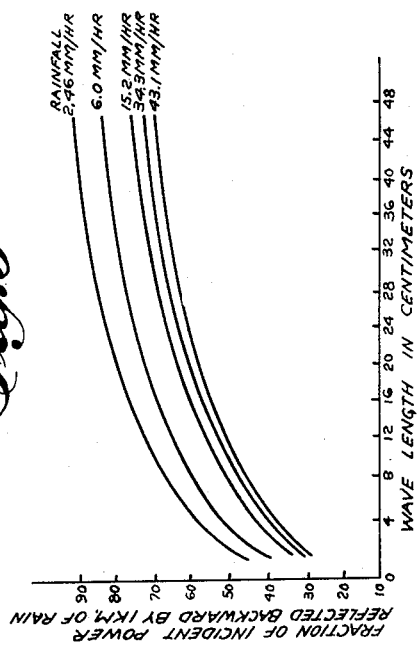
Fig. 3 is a graphic representation of the percentage of incident power reflected by one kilometer of rain having predetermined densities as represented by the various curves as a function of the wavelength of the transmitted energy.
Figure 2:
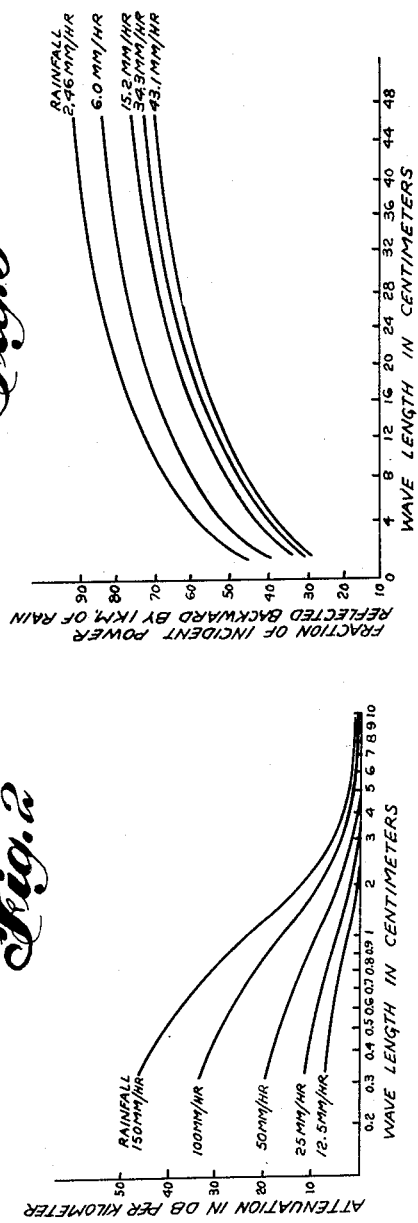
Fig. 2 is a graphic representation of the attenuation as a function of wave length of transmitted electromagnetic energy for various precipitation densities.

Referring to Fig. 3, it is seen that by utilizing a longer wavelength equally unsatisfactory results are obtained. The plurality of curves of Fig. 3 each representing a different precipitation density, show that the back scattering or reflection of the transmitted electromagnetic energy varies as a function of wavelength for each of the rainfall densities. From the curves of Fig. 3 is seen that light precipitation causes a loss of approximately 40 db upon reflection when a wavelength of 10 centimeters is utilized as the transmitting frequency, but when a 3 centimeter wavelength is transmitted the energy loss is only approximately 20 db. The curves of Fig. 2 and Fig. 3 present a paradox wherein if a low frequency is utilized for transmission, in order to penetrate the precipitation formations, and there is insufficient energy returned due to attenuation to give an accurate picture of the area and the conditions beyond, but if a high frequency is employed, there is insufficient penetration of the weather area to determine its depth.

Referring to Fig. 4 of the drawing one embodiment of a meteorological radar system in accordance with the principles of my invention for presenting an accurate picture of a weather zone including precipitation and clouds, and other information necessary for the safe navigation through said zone, is illustrated in schematic form. A plurality of oscillators 21–26 are provided and each is caused to operate at a different wavelength with the wavelengths being widely separated within the electromagnetic spectrum. For example, oscillator 21 may operate at a wavelength of 60 centimeters and oscillator 22 at a wavelength of 30 centimeters, oscillator 23 at a wavelength of 15 centimeters, oscillator 24 at a wavelength of 7½ centimeters and oscillator 25 at a wavelength of 3¾ centimeters and oscillator 26 at a wavelength of 1¾ centimeters. The output of oscillators 21–26 are coupled through anti-transmit-receive switches 27–32 to radiating elements 33–38 of antenna system 39. The antenna elements 33–38 are so arranged that the lower frequency elements act as reflectors for the higher frequency elements and with the aid of a passive parasitic reflector 40 the radiated energy is caused to be focused by parabolic reflector 41. In the usual manner the parabolic reflector 41 is caused to rotate continuously at some speed such as 30 revolutions per minute about a vertical axis in response to shaft 42, gears 43 and shaft 44, all driven by a motor 45. The oscillators 21–26 are triggered by the output of modulator 46 which is in the form of bursts of energy lasting a few microseconds and thus the oscillators 21–26 are caused to couple the usual radar pulsed energy to the antenna system 39. The modulator 46 is triggered by the output of a trigger generator 47 and the output of modulator 46 is coupled to the oscillators 21–26 through the armature of switch 48 whose operation is discontinuous in response to shaft 49, gears 50, 51 and 52 and shaft 53. The action of the gears 52 is such that the armature of switch 48 is coupled to the first contact and the modulator 46 feeds energy to the oscillator 21 for a period of time corresponding to one complete revolution of the parabolic reflector 41 and on the next succeeding revolution the armature of switch 48 is connected to the second contact and the modulator 46 feeds power to oscillator 22 and during the next revolution to oscillator 23 and thence to oscillator 24 and so on until a complete cycle has been completed in which each oscillator 21–26 is coupling the energy to the antenna system 39 during a single revolution of the antenna system and then at the completion of a cycle the armature of switch 48 is reconnected to the first contact. If the precipitation area encountered by the transmitted energy is of the type that is not a good reflector at lower frequencies, such as hail or low densities of rain, energy is returned during those portions of the cycle when the higher frequencies are transmitted. By using wavelengths as long as 60 centimeters there is a measure of assurance that some of the transmitted radiations will always be able to penetrate the precipitation area and give warning of meteorological conditions and other navigation hazards lying beyond. This is extremely important since present day meteorological radar systems utilized by aircraft do not secure this measure of safety. Present radar systems when encountering a heavy storm yield only a mere shadow upon the display tube and beyond the shadow it is impossible to determine either the extent of the storm area or the presence or absence of clear weather lanes.

The energy at the plurality of frequencies transmitted by the meteorological radar system above described is reflected by precipitation areas, clouds, other meteorological phenomena as well as navigation hazards and is received on the same antenna system 39 as is utilized for the transmission of the energy. The reflected energy is concentrated by the parabolic reflector 41 onto the plurality of antenna elements 33–38, which couple the energy through transmit-receive switches 54–59 to the converter units 60–65. The converter units 60–65, which might be termed "heterodyne units," each comprise an oscillator which beats the incoming frequency to a lower intermediate frequency, an automatic frequency control circuit which is coupled to and follows the frequency drift of the transmitting oscillators 41–46 thus assuring that the local oscillator remains at the correct frequency and mixer circuits in which the beating of the incoming and local oscillating frequencies occur. It is apparent that converter 60 is utilized to detect the energy reflected back as a result of the transmission from oscillator 21 and similarly converter 61 is utilized to detect the energy reflected back as a result of transmission from oscillator 22 and the other converters 62–65 are utilized to detect the energy transmitted in response to the output of their respective associated oscillators 23–26 and which is reflected back from obstructions or precipitation areas. In each of the converters 60–65 the frequency is heterodyned to a lower frequency so that it may be amplified and detected. The output of the converter units 60–65 is amplified and then detected and a further amplification of the resulting video frequency is accomplished all in the common amplification unit 66.

The output video signal from amplification unit 66 is coupled to the armature of switch 67. The armature of switch 67 is driven via shaft 68 from the gear mechanism 50, 51, and 52 and with this arrangement the video signal output of the amplifier circuit 66 is connected for a period corresponding to one revolution of the antenna unit 39 to the first storage tube 69 and during the next revolution to the storage tube 70 and then in sequence to storage tubes 71, 72, 73 and 74. These storage tubes are adjusted so that they are capable of recording a signal for a period of time which is in excess of the period of six antenna revolutions. The writing beam of each of the storage tubes 69-74 is intensely modulated by the application of the video signal from amplifier circuit 66, coupled through switch 67 to the grids 75-80 of each of the storage tubes. The writing beam is positioned by the magnetic deflection coils 81-86 associated with each of the storage tubes 69-74, respectively. The deflecting coils 81-86 in turn are energized by the secondary winding 87 of a resolver 88 which has its primary winding 89 rotated in synchronism with the rotation of the antenna system 39 through gears 51 and shaft 90 responsive to the motor 45. The trigger generator 47 has its output coupled to a sweep timer circuit 91 which determines the total duration of the timing cycle and whose output triggers a sawtooth generator 92 to generate the usual sawtooth voltage having an amplitude proportional to time after triggering. The output of the sawtooth generator 92 is amplified in circuit 93 and coupled to the rotating primary winding 89 of the resolver 88. In accordance with the usual principles of resolver operation it can be seen that the voltage which appears in the primary 89 is resolved into three components varying in intensity as a function of time after a pulse is transmitted from the antenna system 39. The three components from the secondary winding 87 of the resolver 88 are coupled to the writing beam deflecting coils 81-86 of the storage tubes 69-74 and position the writing beam of the storage tubes at an angle proportional to the direction in which the antenna 39 is directed and the writing beam has a radial distance in the storage tube, which is proportional to the time between transmission and reception of a radar pulse. Other storage devices capable of storing the information for a period of time equal to six revolutions of the antenna system may of course be utilized in the place of the storage tubes used herein for illustration.

An oscillator 94 operating at a convenient frequency, such as 70 megacycles, is coupled to the readout grids 107-112 and its output is used to modulate the electron beams of the storage tubes 69-74 so that the charge on the storage screens 95-100 is not dissipated. The reading beam is caused to move across the face of the storage screens 95-100 by the readout deflection coils 101-106 which are energized by the quadrature voltages generated in the television synchronizing generator 113.

In accordance with well-known storage tube theory the output of the readout beams is determined by the charge on the storage screens 95-100. This output is connected to amplifier-detector circuits 114-119 whose outputs are at video frequency and are connected in parallel to the grid 120 of a three gun color cathode ray tube 121. It is apparent from the connections that the electron beam of the tube 121 is intensity modulated as a function of the targets that appear on the screen of all of the storage tubes and that the position of the electron beam is determined by the deflection coils 122 which in turn are driven by the output of the television synchronizing generator 113. Since the driving of the deflection coils of the cathode ray tube 121 is correlated with the driving of the readout beams of the storage tubes 69-74, it is seen that the beam of the color tube has a position which is similar to the position of the electron beams on all of the storage tubes which in turn represent the positions of the targets illuminated by the output of the multi-frequency radar system. The output of the individual amplifier detector circuits 114-119 are isolated from each other by rectifier devices 123-128 and the unidirectional output of the rectifier devices 123-128 are applied to a delta type voltage dividing network 129 whose corners are coupled to the deflection devices 130-132 associated with the blue electron gun, the green electron gun and the red electron gun. Thus, as a spot appears on the face 133 of the color tube 121 which is due to the signal from amplifier 114, it is apparent that it will appear to be blue in color because the voltage passing through rectifier 123 is applied to the blue deflection means 130 simultaneously. It can be readily appreciated that there will appear on the face 133 of the color tube 121 a graphic representation or map of the precipitation area surrounding an aircraft and that the density of these areas will be clearly indicated by the color on the tube face. Sharp changes in turbulence, weather areas or cloud densities are distinctly marked due to the sharp variation of color combinations whereas when the density changes slowly over a great distance a broad band of intermediate color will appear on the face of the screen. With a little training an intelligent observer can be expected to read with great accuracy weather conditions surrounding the aircraft, as well as by noting the color areas portrayed on the tube.

Figure 5:
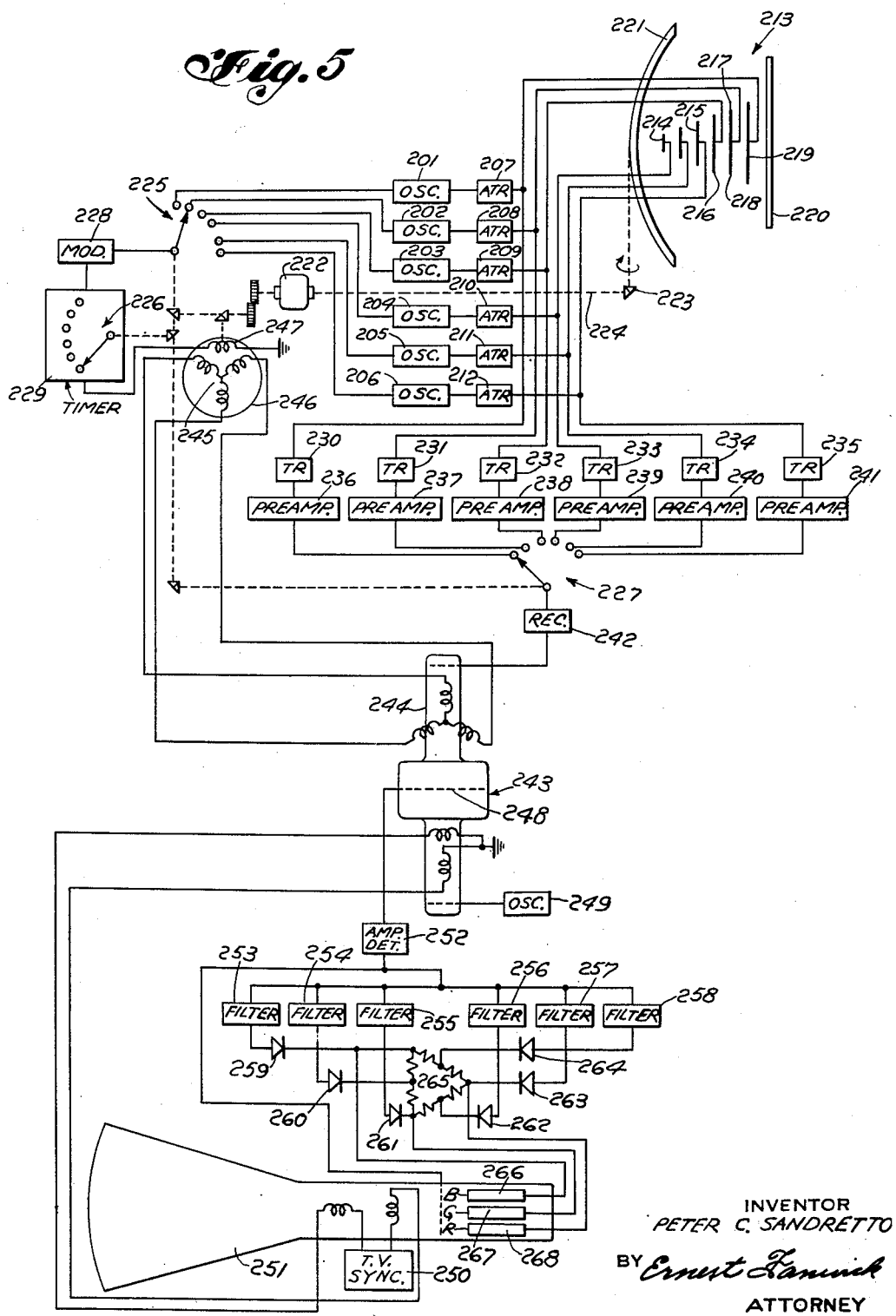

Referring to Fig. 5 of the drawing, a schematic diagram partly in block form of an alternate embodiment of a meteorological radar system in accordance with the principles of my invention is shown wherein a reduction in equipment over the system illustrated in Fig. 4 is achieved. In accordance with the metorological radar system previously described a plurality of oscillators 201-206, each operating at a different frequency which, for example, may be spread from 17,000 to 500 megacycles have their output coupled through anti-transmit receive swiches 207-212 to the directive antenna system 213. The antenna system 213 comprises a plurality of radiators 214-219 each associated with a different transmission frequency source and a passive parasitic reflector 220.

The antenna elements 214-219 have their energy concentrated by a parabolic reflector 221 and the entire antenna system 213 is rotated responsive to a motor 222 and associated gears 223 and shaft 224. A plurality of discontinuously operated switches 225, 226, and 227 are mechanically coupled and driven in response to the motor mechanism 222. A modulator 228 energizes the oscillators 201-206 and is coupled through switch 225 to the first oscillator 201 for a period of time substantially equal to a single revolution of the antenna system 213 after which it is connected to the second oscillator 202 and a period of time equal to a revolution of the antenna system 213 and so on until a single cycle is completed during which time the modulator 228 is operatively connected to each of the oscillators 201-206 for a period of time equal to a single revolution of the antenna system 213. The modulator 228 is triggered in response to the output of a timer circuit 229. The timer circuit 229 includes the discontinuously operated switch 226 whose armature is responsive to the motor mechanism 222 and is coupled to each of its contacts for a single revolution of the antenna system 213. Each contact of the switch 226 causes a different pulse repetition rate to be coupled from the timer circuit 229 to the modulator 228 so that the pulse repetition rate sequentially changes in synchronism with a change in the frequency of the energy transmitted. In other words, not only is the radio frequency of the transmitted energy changed in synchronism with the rotation of the antenna system 213, but the pulse repetition rate of the energy is also varied.

The energy received by the antenna system 213 which has been reflected by the various meteorological conditions and navigation hazards and obstructions is coupled from the antenna elements 214-219 and through the usual transmit-receive switches 230-236 to the preamplifier circuits 236–241, each of which is tuned to one of the frequencies of the oscillators 201–206. The outputs of each of the preamplifier circuits 236–241 is coupled to one contact of the switch 227 whose armature is discontinuously moved responsive to the motor mechanism and thus the armature of the switch 227 couples the appropriate preamplifier output to a receiver 242 where the reflected energy is detected. The detected video frequency output of the receiver 242 intensity modulates the writing beam of a storage tube 243 by being coupled to the grid. The writing beam of the storage tube 243 is radially positioned in synchronism with the direction of the antenna system 213 when the energy is received and it is positioned in radial distance responsive to the time between transmission and reception of a pulse by the use of magnetic deflection coils 244 for the writing beam which generate magnetic fields responsive to the output of the secondary winding 245 of the resolver 246 whose primary winding 247 is coupled to the output of the timing circuit 229.

The target areas detected responsive to the energy reflected are written on the screen 248 of the storage tube 243 and the energy due to the transmission of each oscillator frequency is detectable because it has a different structure due to the variation in the pulse repetition rate that was employed. For example, it may be assumed for purposes of explanation that the oscillator 201 generates a frequency of 17,000 megacycles having a pulse repetition rate of 1,000 pulses per second. Any observable target can be detected from the energy reflected by the target because it is painted on the screen 248 of the storage tube 243 as a spot having a structure corresponding to a thousand pulses per second. During the next revolution of the antenna system 213 oscillator 202 operating at an assumed frequency of 8,000 megacycles per second and transmitting a pulse repetition rate of 800 pulses per second stores a target on the screen 248 of the storage tube 243 as a spot having a structure corresponding to the 800 pulses per second.

A local oscillator 249 operating at a convenient frequency, such as 30 megacycles, is used to energize the readout beam of the storage tube 243. The readout beam traverses the storage area 248 of the storage tube 243 in response to the output of a television synchronizing generator 250 which causes the beam of a colored cathode ray tube 251 to be swept in synchronism with the readout beam of the storage tube 243. An amplifier-detector 252 tuned to the frequency of the local oscillator 249 detects the stored signal readout from the storage screen 248 of the storage tube 243 and couples the detected output to the six filters 253–259 each adjusted to pass one of the pulse repetition frequencies generated in the timing circuit 229 and triggering the modulator 228. The output of the pulse repetition frequency filters 253–258 are connected through the rectifier units 259–264 to a delta network 265 which in turn is coupled to the three-color control plates 266–268 of the colored cathode ray tube 251. The output of the amplifier-detector unit 252 is also coupled directly to the grid of the cathode ray tube 251 to intensity modulate the electron beam. It can be readily appreciated that a signal passed through a single filter, for example, filter 259 associated with the pulse repetition rate of oscillator 201 would display a target, on the face of the cathode ray tube 21 in blue and a signal passed through the filter 263 associated with the pulse repetition frequency of oscillator 205 would be displayed in red, whereas a target detected by the energies transmitted at the frequency due to oscillator 206 would be displayed in purple.

Many changes could be made in the above construction and many apparent widely different embodiments of this invention could be made without departing from the scope thereof. For example, the storage tube herein illustrated as the storage means for the detected signal may be replaced by other storage devices, such as magnetic drums.

Additionally, by combining the display derived from the radar system of this invention with other information, for example, by placing a map in front of the display tube and making the map move in response to data furnished from a suitable navigation system, a chart of the terrain over which the aircraft is flying together with the meteorogical conditions over that terrain may be obtained and thus on a single cathode ray tube a complete representation of all necessary navigational information may result.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radar system to detect at least one of a plurality of targets each reflecting energy at a preferential frequency comprising a plurality of signal sources each at a different frequency, means to transmit said plurality of frequencies, receiving means for detecting the reflected signals from at least one of said targets and means for deriving information signals representative of said targets from said detected signals in accordance with the frequency of said detected signals.

2. A radar system to detect at least one of plurality of targets each reflecting energy at a preferential frequency comprising a plurality of signal sources each at a different frequency, means to transmit in sequence said plurality of frequencies, receiving means for detecting the reflected signals from at least one of said targets and means for deriving information signals representative of said targets from said detected signals in accordance with the frequency of said detected signals.

3. A radar system comprising a plurality of signal sources each at a different frequency, antenna means for directively radiating said signals, means for switching successively said plurality of sources to said antenna means, directive reception means for detecting signals reflected at said plurality of frequencies and means for deriving signals from said detected signals in accordance with said frequency.

4. In radar apparatus for systematically radiating meteorological conditions in a given area and for forming graphic representations of said conditions in response to electromagnetic energy reflected therefrom, the combination comprising means for sequentially altering the frequency of said radiating energy, means for deriving signals from said reflections in accordance with the frequency of said radiations for forming graphic representations of said conditions and objects and means responsive to said signals for coloring said representations as a function of the frequency of the reflected signal.

5. Radar apparatus comprising a plurality of signal sources each at a different frequency, directive antenna means adapted to radiate successive portions of a given area for detection of meteorological conditions, means to couple in sequence said frequency sources to said antenna, means to receive signal reflections from said conditions, means for storing signal energy reflected at each of said frequencies for a period of time substantially equal to the time for the transmission and reception of signals at the other of said frequencies, means to derive signals from said storage means indicative of said conditions and means responsive to said derived signals for forming a graphic representation in color of said area.

6. Radar apparatus comprising a plurality of signal sources each at a different frequency, directive antenna means adapted to radiate successive portions of a given area for detection of meteorological conditions, means to pulse modulate each of said sources at a different pulse repetition rate, means to couple in sequence said pulse modulated signals to said directive antenna, means to receive reflections from said conditions, means for storing the signals reflected at each of said frequencies and each of said pulse repetition rates for a period of time sufficient for the transmission and reception of energy at the other of said frequencies, means responsive to said pulse repetition rates for deriving signals from said storage means indicative of said conditions and means responsive to said derived signals for forming a graphic representation in color of said area.

7. Radar apparatus comprising a plurality of signal sources each at a different frequency, directive antenna means adapted to radiate successive portions of a given area for detection of meteorological conditions, drive means to cause said antenna means to rotate, means responsive to said drive means to pulse modulate said sources at a different pulse repetition rate for successive revolutions of said antenna rotation, means responsive to said drive means to couple in sequence said pulse modulated signals to said directive antenna, means to receive reflections from said conditions, means for storing the signals reflected at each of said frequencies and each of said pulse repetition rates for a period of time sufficient for the transmission and reception of energy at the other of said frequencies, means for detecting said stored signals, means for deriving information signals responsive to the pulse repetition rate of the detected signals and means responsive to said information signals for forming a graphic representation in color of said area.

8. Radar apparatus comprising a plurality of signal sources each at a different frequency, directive antenna means adapted to radiate successive portions of a given area for detection of meteorological conditions, drive means to rotate said directive antenna, modulator means to trigger said signal sources, means responsive to said drive means to couple in sequence said modulator means to said signal sources, means to couple the output of said signal sources to said antenna means, means to receive signal reflections from said conditions, a plurality of signal storing means, one for each of said plurality of signal sources, means responsive to said drive means for coupling said received signal reflections to said storage means, means for detecting said stored signal energy, means to derive information signals from said detected stored signals in accordance with the frequency of transmission and indicative of said conditions and means responsive to said derived signals for forming a graphic representation in color of said area.

References Cited in the file of this patent
UNITED STATES PATENTS

| | | |
|---|---|---|
| 2,593,071 | Sunstein et al. | Apr. 15, 1952 |
| 2,676,317 | Purington | Apr. 20, 1954 |
| 2,682,048 | Longacre | June 22, 1954 |

OTHER REFERENCES

"Radar Echoes from Meteorological Precipitation," Hooper and Kippox. Proceedings of the Institution of Electrical Engineers, vol. 97, Part I, No. 105, May 1950, pages 89–95.

Disclaimer 2,822,536.—*Peter C. Sandretto*, East Orange, N.J. METEOROLOGICAL RADAR. Patent dated Feb. 4, 1958. Disclaimer filed Apr. 9, 1962, by the assignee, *International Telephone and Telegraph Corporation*.

Hereby enters this disclaimer to claims 1, 2, 3, and 4 of said patent.

[*Official Gazette May 22, 1962.*]